US006383626B1

(12) United States Patent
Fukuda et al.

(10) Patent No.: US 6,383,626 B1
(45) Date of Patent: May 7, 2002

(54) MAGNETIC FERRITE FILM FOR MAGNETIC DEVICES

(75) Inventors: Yasutaka Fukuda, Chiyoda-ku; Yoshihito Tachi, Taito-ku, both of (JP)

(73) Assignee: Kawatetsu Mining Co., Ltd., Tokyo (JP)

( * ) Notice: Subject to any disclaimer, the term of this patent is extended or adjusted under 35 U.S.C. 154(b) by 0 days.

(21) Appl. No.: 09/548,344

(22) Filed: Apr. 12, 2000

(30) Foreign Application Priority Data

Apr. 19, 1999 (JP) .......................................... 11-111065

(51) Int. Cl.[7] .................................................. G11B 5/66

(52) U.S. Cl. ....................... 428/332; 428/336; 428/692; 428/694 BA; 428/694 T; 428/694 ST; 428/900; 427/128; 427/129; 427/130

(58) Field of Search .......................... 428/692, 694 BA, 428/694 T, 694 ST, 900, 332, 336; 427/128–130

(56) References Cited

U.S. PATENT DOCUMENTS

| | | | | | |
|---|---|---|---|---|---|
| 5,296,458 A | * | 3/1994 | Himpsel | ..................... | 505/473 |
| 5,593,951 A | * | 1/1997 | Himpsel | ..................... | 505/235 |

FOREIGN PATENT DOCUMENTS

| | | | |
|---|---|---|---|
| JP | A-9-134820 | | 5/1997 |
| JP | A-11-26239 | | 1/1999 |
| JP | A1126239 | * | 1/1999 |
| JP | 11 026239 A | | 1/1999 |

OTHER PUBLICATIONS

T. Nakamura, "Low–temperature sintering of Ni–Zn–Cu ferrite and its permeability spectra", Journal of Magnetism and Magnetic Materials, vol. 168, 1997, 285–291.

Journal of the Applied Magnetics Society of Japan, Vo. 20, No. 5, 1996, p. 992, T. Mizoquchi "Micro DC/DC Converter Using Thin Film Inductor".

* cited by examiner

*Primary Examiner*—Leszek Kiliman
(74) *Attorney, Agent, or Firm*—Oliff & Berridge, PLC

(57) ABSTRACT

A magnetic ferrite paste is applied onto an Si substrate, and then sintered to form thereon a magnetic ferrite film having a mean composition that comprises from 40 to 50 mol % of $Fe_2O_3$, from 15 to 35 mol % of ZnO, from 0 to 20 mol % of CuO, and from 0 to 10 mol % of $Bi_2O_3$ with NiO and inevitable impurities as the balance. The magnetic ferrite film thus formed on an Si substrate is for magnetic devices, and it forms a region not containing CuO or having a CuO content of at most 5 mol % around its interface directly adjacent to the surface of the Si substrate. The adhesiveness of the magnetic ferrite film to the underlying Si substrate is high, and the reliability of the magnetic device having the magnetic film is therefore high.

12 Claims, No Drawings

MAGNETIC FERRITE FILM FOR MAGNETIC DEVICES

BACKGROUND OF THE INVENTION

1. Field of the Invention

The present invention relates to a magnetic ferrite film for magnetic devices, in particular, to that with improved adhesiveness to Si substrates.

2. Description of the Related Art

Small-sized and lightweight portable appliances capable of being driven by the power of batteries are in great demand. For application to multi-media information services, they are much desired to have advanced functions including communication and display functions, and also to have the capabilities of rapidly processing large-scale information media including images, etc. With these, there is much increasing a great demand for power sources capable of converting a single voltage from batteries to a plurality of different voltages applicable to different types of devices such as CPUs, LCD modules, power amplifiers for communication, etc. For small-sized and lightweight portable appliances with such advanced functions, the important theme is to realize small-sized, high-efficiency power sources.

In that situation, much used are DC-DC converters in which the direct current inputted is intermittently controlled by the action of a semiconductor switch to give a stable, desired voltage to be outputted from it. In the Journal of the Applied Magnetics Society of Japan, Vol. 20, No. 5, 1996, p. 922, described is a power source with a plane inductor mounted thereon, in which the inductor comprises a thin magnetic film. In Japanese Patent Laid-Open No. 134820/1997, disclosed is a plane magnetic device (e.g., inductor, etc.) with a plane coil being sandwiched between a soft magnetic substance via an insulator therebetween, in which the plain coil conductor is composed of a plurality of conductor lines divided in different sections. These are suitable to thin devices, and are expected to be used in the field of portable appliances and others that are required to be small-sized and lightweight.

However, the conventional plane inductors are produced by forming a magnetic metal film of from 6 to 7 $\mu$m thick on Si substrates through sputtering or the like. Therefore, as compared with those for other conventional inductors with a conductor line wound around a sintered ferrite core, the production costs for such plane inductors inevitably increase, and it is a bar to industrialization of the plane inductors. To solve this problem, we, the present inventors have already proposed a technique of substituting the magnetic metal film in those plane inductors with a magnetic ferrite film to be formed through printing or the like (see Japanese Patent laid-Open No. 26239/1999).

However, the technique requires further improving the adhesiveness of the magnetic ferrite film to Si substrates. If its adhesiveness thereto is not good, the magnetic ferrite film will peel away from Si substrates in the process of fabricating magnetic devices comprising the film-coated substrate, and the reliability of the devices fabricated will be thereby lowered.

SUMMARY OF THE INVENTION

In that situation, the present invention is to increase the adhesiveness of a magnetic ferrite film to Si substrates thereby to improve the reliability of thin-film magnetic devices comprising the film-coated substrate.

Specifically, the invention is a magnetic ferrite film formed on an Si substrate for magnetic devices, in which the areal ratio of the Si—Cu rich phase to the magnetic film, at least to the part thereof directly adjacent to the surface of the Si substrate is at most 50%, or the CuO content of the magnetic film at least in the part of the film directly adjacent to the surface of the Si substrate is at most 5 mol %.

DESCRIPTION OF THE PREFERRED EMBODIMENTS

To solve the problems noted above, the CuO content of the part of the magnetic film directly adjacent to the Si substrate shall be at most 5 mol %. The reason is as follows: We, the present inventors have assiduously studied the adhesiveness of magnetic ferrite films to Si substrates and have found that a Cu—Si rich deposit phase, when formed in the interface between the magnetic film and the Si substrate through the reaction of Cu in the magnetic film with Si of the substrate, significantly lowers the adhesiveness between the magnetic film and the Si substrate. On the basis of this finding, we have reached the conclusion that reducing the Cu—Si rich deposit phase in the interface between the magnetic film and the Si substrate results in the increase in the adhesiveness therebetween. For this, the CuO content of the magnetic ferrite film at least in the part of the film existing around the interface between the film and the Si substrate must be at most 5 mol %. If it is larger than 5 mol %, the Cu—Si rich deposit phase will be much formed around the interface between the magnetic film and the Si substrate, thereby lowering the adhesiveness therebetween. Therefore, in the invention, the CuO content of the magnetic ferrite film around the interface between the film and the Si substrate is defined to be at most 5 mol % throughout the film; or it may be defined to be at most 5 mol % only in the area around the interface between the film and the Si substrate, while in the other area the CuO content could be over 5 mol %.

To produce the magnetic ferrite film of that type, for example, a first ferrite layer having a CuO content of not larger than 5 mol % is printed on an Si substrate, and the second and other ferrite layers having a CuO content of larger than 5 mol % are printed over the first layer. In this process, the thickness of the first layer (having a CuO content of not larger than 5 mol %) varies, depending on the printing condition employed, but may be generally at most about 1 $\mu$m or so. In practice, therefore, a ferrite layer having CuO content of at most 5 mol % shall be realized within the range of up to about 1 $\mu$m from the interface between the layer and the Si substrate.

So far as the CuO content of the magnetic ferrite film is not larger than 5 mol % in the interface between the film and the Si substrate, good adhesiveness of the film to the substrate could be ensured. In this case, preferably, the magnetic film is of a spinel ferrite comprising from 40 to 50 mol % of $Fe_2O_3$, from 15 to 35 mol % of ZnO, from 0 to 20 mol % of CuO, and from 0 to 10 mol % of $Bi_2O_3$ with NiO and inevitable impurities as the balance, for the average composition of the entire film. The reason why the composition of the magnetic film is defined as above is mentioned below. $Fe_2O_3$, from 40 to 50 mol %:

If $Fe_2O_3$ is over 50 mol %, $Fe^{2+}$ ions existing in the film will greatly lower the electric resistance of the film. The reduction in the electric resistance of the film shall increase the ferrite core loss. On the other hand, if $Fe_2O_3$ is below 40 mol %, the inductance of the film will be greatly lowered. Therefore, $Fe_2O_3$ is defined to fall between 40 and 50 mol %. ZnO, from 15 to 35 mol %:

ZnO has great influences on the inductance and the Curie temperature of the film. Preferably, the Curie temperature of the film is not lower than about 120° C. If ZnO is below 15 mol %, the inductance of the film will be lowered even though the Curie temperature thereof could be high. On the other hand, if ZnO is above 35 mol %, the Curie temperature of the film will be low even though the inductance thereof could be high. Therefore, ZnO is defined to fall between 15 and 35 mol %. CuO, from 0 to 20 mol %:

CuO is added to the film so as to lower the temperature at which the film is sintered. The CuO content of the film is defined to be at most 5 mol % in the area around the interface between the film and the underlying Si substrate, as so mentioned hereinabove. In the other area, it is desirable that the CuO content of the film falls between 0 and 20 mol %. If CuO is above 20 mol %, it could lower the sintering temperature but will reduce the inductance of the film. Therefore, the uppermost limit of CuO is defined to be 20 mol %. If the sintering temperature does not need to be lowered, no CuO may be added to the film. Therefore, except for the inevitable amount thereof, the lowermost limit of CuO could be 0%. In this case, adding CuO to the area around the interface between the film and the substrate is unnecessary. $Bi_2O_3$, from 0 to 10 mol %:

Like CuO, $Bi_2O_3$ also acts to lower the sintering temperature. If $Bi_2O_3$ is above 10 mol %, it could lower the sintering temperature but will reduce the inductance of the film. Therefore, the uppermost limit of $Bi_2O_3$ is defined to be 10 mol %. If the sintering temperature does not need to be lowered, no $Bi_2O_3$ may be added to the film.

Actual synthetic products of ferrite generally have a complicated structure comprising plural metal ions of different valences. In the present invention, however, the metal ions constituting ferrite are expressed as their oxides, concretely as $Fe_2O_3$, NiO, ZnO and CuO in which Fe is a trivalent ion, and Ni, Zn and Cu are divalent ions.

The method of producing the magnetic ferrite film of the invention is not specifically defined. Preferably, the film is produced by mixing a ferrite powder having been previously prepared to have a predetermined composition, with a binder such as ethyl cellulose or the like to give a paste, then applying the resulting paste onto an Si substrate, and sintering it at a temperature falling between 920 and 1250° C. While the ferrite powder is mixed with a binder, a solvent such as butylcarbinol, terpineol or the like may be added thereto, if desired. The method of applying the paste onto an Si substrate is not also specifically defined, including, for example, screen printing, doctor blade coating, etc. On the surface of the ferrite film thus formed in the manner as above, a plane-structured coil pattern is formed through metal plating or the like; and another magnetic ferrite or metal film is formed over the patterned surface. In that manner, magnetic devices such as transformers, inductors and others comprising the magnetic ferrite film of the invention are fabricated.

The invention is described in more detail with reference to the following Examples, which, however, are not intended to restrict the scope of the invention.

EXAMPLE 1

A first ferrite layer to have a thickness of 7 μm (this is after sintered, and the same shall apply hereunder) and a second ferrite layer to have a thickness of 30 μm were formed on an Si substrate by printing, and then sintered in air at a temperature falling between 920 and 1250° C. The CuO content of the second layer was settled to be 15 mol %, while that of the first layer was varied to fall between 0 and 15 mol % as in Table 1 below. 100 samples thus prepared (all having a pattern profile of 5×5 mm) were left in an atmosphere at 85° C. and 98% RH (relative humidity) for 4 hours, and then subjected to an adhesive tape peeling test. After the test, the number of samples not peeled was counted. In addition, the peeled interface was observed with a microscope, and the a real ratio of the Si—Cu rich phase having deposited around the interface was measured. The data obtained are given in Table 1. As in Table 1, it is understood that 75% or more samples in which the CuO content of the first ferrite layer directly adjacent to the Si subtrate is not larger than 5 mol % are good with no peeling of the ferrite layer from the substrate. This supports good adhesiveness of the magnetic ferrite film to the Si substrate in those samples. Referring to the Si—Cu rich phase having deposited around the interface between the ferrite film and the Si substrate, the samples in which the a real ratio of the Si—Cu rich deposit phase is at most about 50% are good, as the adhesiveness between the ferrite film and the Si substrate therein is high.

TABLE 1

| No. | CuO Content of First Layer (mol %) | Adhesiveness (%) | Areal Ratio of Si—Cu Rich deposit Phase (%) |
|---|---|---|---|
| Case 1 of the Invention | 0 | 99 | 0 |
| Case 2 of the Invention | 1 | 90 | 20 |
| Case 3 of the Invention | 3 | 80 | 30 |
| Case 4 of the Invention | 5 | 75 | 48 |
| Comparative Case 1 | 6 | 40 | 70 |
| Comparative Case 2 | 9 | 30 | 75 |
| Comparative Case 3 | 15 | 20 | 80 |

EXAMPLE 2

On an Si substrate, formed was a lower magnetic ferrite film through printing and sintering. The composition and the structure of ferrite for the lower film are given in Table 2. In these samples prepared herein, the composition of the first layer for Cases 5 to 15 of the invention was $Fe_2O_3$/Zno/CuO/$Bi_2O_3$=49/23/0/0 (mol %, with NiO as the balance), and that of the first layer for Comparative Case 4 was $Fe_2O_3$/ZnO/CuO/$Bi_2O_3$=49/23/8/5 (mol %, with NiO as the balance); the thickness of the first layer was 5 μm; the composition of the second layer was as in Table 2; and the thickness of the second layer was 30 μm. Over the lower magnetic ferrite film thus formed on the Si substrate, a spiral, plane copper coil was formed by plating, and this was covered with an upper magnetic film of amorphous $Fe_{59}Co_{20}B_{14}C_7$ (6 μm). The inductors thus prepared were tested for the inductance at 5 MHz, and their Curie temperature was measured. The data obtained are given in Table 2. In addition, these samples were left in an atmosphere at 85° C. and 98% RH for 4 hours, and then subjected to the same adhesive peeling test as above. After the test, the samples of Cases 5 to 15 of the invention did not peel; but those of Comparative Case 4 peeled. From Table 2, it is understood that the samples of the invention, in which the CuO content of the magnetic ferrite film directly adjacent to the surface of the Si substrate is at most 5 mol % and in which the magnetic ferrite film comprises, on average of the entire film, from 40 to 50 mol % of $Fe_2O_3$, from 15 to 35 mol % of ZnO, from 0 to 20 mol % of CuO, and from 0 to 10 mol % of $Bi_2O_3$ with NiO as the balance, all have high inductance and high Curie temperature, and are all excellent magnetic devices.

TABLE 2

| No. | $Fe_2O_3$ mol % | ZnO mol % | CuO mol % | $Bi_2O_3$ mol % | Inductance μH (5 MHz) | Curie Temperature (° C.) |
|---|---|---|---|---|---|---|
| Case 5 of the Invention | 49 | 23 | 20 | 0 | 1.4 | 330 |
| Case 6 of the Invention | 45 | 15 | 0 | 7 | 1.0 | 380 |
| Case 7 of the Invention | 41 | 30 | 0 | 2 | 1.0 | 200 |
| Case 8 of the Invention | 49.5 | 20 | 12 | 0 | 1.2 | 320 |
| Case 9 of the Invention | 49 | 34 | 0 | 10 | 1.7 | 140 |
| Case 10 of the Invention | 38 | 30 | 12 | 0 | 0.6 | 190 |
| Case 11 of the Invention | 51 | 22 | 12 | 0 | 0.4 | 320 |
| Case 12 of the Invention | 49 | 13 | 15 | 2 | 0.6 | 390 |
| Case 13 of the Invention | 49 | 37 | 10 | 2 | 1.1 | 50 |
| Case 14 of the Invention | 49 | 25 | 22 | 2 | 0.5 | 260 |
| Case 15 of the Invention | 49 | 25 | 0 | 13 | 0.3 | 270 |
| Comparative Case 4 | 52 | 20 | 10 | 12 | 0.3 | 300 |

According to the invention, provided is a magnetic ferrite film for magnetic devices, of which the adhesiveness to Si substrates is much enlarged. The reliability of the magnetic devices comprising the film of the invention is therefore better than that of conventional magnetic devices.

What is claimed is:

1. A magnetic ferrite film formed on a surface of an Si substrate for magnetic devices, wherein a CuO content of the magnetic film in a part of the magnetic film directly adjacent to the surface of the Si substrate is at most 5 mol %.

2. The magnetic ferrite film for magnetic devices as claimed in claim 1, which comprises, on average of the entire film, from 40 to 50 mol % of $Fe_2O_3$, from 15 to 35 mol % of ZnO, from 0 to 20 mol % of CuO, and from 0 to 10 mol % of $Bi_2O_3$ with NiO and inevitable impurities as the balance.

3. The magnetic ferrite film for magnetic devices as claimed in claim 1, which is formed by applying a ferrite powder-containing paste onto an Si substrate followed by sintering it.

4. A magnetic device comprising the magnetic film of claim 1.

5. An electric appliance comprising the magnetic device of claim 4.

6. A magnetic ferrite film formed on an Si substrate for magnetic devices, in which an a real ratio of Si—Cu rich phases deposited around an interface between the magnetic film and the Si substrate to a whole area of the interface is at most 50%.

7. A magnetic device comprising the magnetic film of claim 6.

8. An electric appliance comprising the magnetic device of claim 7.

9. Th magnetic ferrite film for magnetic devices as claimed in claim 2, which is formed by applying a ferrite powder-containing paste onto an Si substrate followed by sintering it.

10. The magnetic ferrite film for magnetic devices as claimed in claim 1, wherein the part of the magnetic film directly adjacent to the surface of the Si substrate is at least about 1 μm thick.

11. The magnetic ferrite film for magnetic devices as claimed in claim 1, wherein the magnetic ferrite film comprises at least two layers, a first layer directly adjacent the surface of the Si substrate and a second layer thereon, the first layer having a CuO content of at most 5 mol %.

12. The magnetic ferrite film for magnetic devices as claimed in claim 11, wherein the first layer is at least about 1 μm thick.

* * * * *